(12) United States Patent
Srinivasan et al.

(10) Patent No.: US 10,341,242 B2
(45) Date of Patent: Jul. 2, 2019

(54) SYSTEM AND METHOD FOR PROVIDING A PROGRAMMABLE PACKET CLASSIFICATION FRAMEWORK FOR USE IN A NETWORK DEVICE

(71) Applicant: Oracle International Corporation, Redwood Shores, CA (US)

(72) Inventors: Arvind Srinivasan, San Jose, CA (US); Marcelino Dignum, Menlo Park, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 15/377,303

(22) Filed: Dec. 13, 2016

(65) Prior Publication Data
US 2018/0167329 A1    Jun. 14, 2018

(51) Int. Cl.
*H04L 29/06*   (2006.01)
*H04L 12/741*   (2013.01)
(Continued)

(52) U.S. Cl.
CPC .......... *H04L 47/2441* (2013.01); *H04L 45/54* (2013.01); *H04L 45/745* (2013.01); *H04L 69/22* (2013.01); *H04L 45/7453* (2013.01)

(58) Field of Classification Search
None
See application file for complete search history.

(56) References Cited

U.S. PATENT DOCUMENTS

| | | | |
|---|---|---|---|
| 7,154,888 B1 * | 12/2006 | Li | H04L 45/742 370/389 |
| 7,783,654 B1 * | 8/2010 | Sreenath | G11C 15/00 365/189.07 |

(Continued)

FOREIGN PATENT DOCUMENTS

| | | |
|---|---|---|
| CN | 1968212 | 5/2007 |
| WO | 2012081148 | 6/2012 |

OTHER PUBLICATIONS

Sundar Iyer et al., "ClassiPI™: An Architecture for Fast and Flexible Packet Classification", PMC-Sierra Inc., 2001, 13 pages.
(Continued)

*Primary Examiner* — Candal Elpenord
(74) *Attorney, Agent, or Firm* — Tucker Ellis LLP (57) ABSTRACT

In accordance with an embodiment, described herein is a system and method for providing a programmable packet classification framework for use in a network device in a high performance network. The packet classification framework can comprise a plurality of hardware-based programmable classification primitives, including a key composition primitive, a key composition rule primitive, a match action logical structure, and a next action primitive. The classification primitives can be logically strung together, with the results from one classification primitive fed into the next one until the processing of a data packet is completed. The classification framework can use a state machine to track states of the data packet processing, and dynamically adjust behaviors of the classification primitives based on the processing states of a data packet. With the programmable classification primitives, the classification framework can recursively parse data packets of a plurality of protocols without requiring any hardware changes.

20 Claims, 6 Drawing Sheets

(51) Int. Cl.
*H04L 12/743* (2013.01)
*H04L 12/851* (2013.01)

(56) References Cited

U.S. PATENT DOCUMENTS

| | | | |
|---|---|---|---|
| 2004/0213235 A1* | 10/2004 | Marshall | H04L 12/4641 370/392 |
| 2005/0141519 A1 | 6/2005 | Rajgopal | |
| 2006/0251109 A1* | 11/2006 | Muller | H04L 45/745 370/463 |
| 2008/0037546 A1 | 2/2008 | Ishikawa | |
| 2008/0109565 A1 | 5/2008 | Ajanovic | |
| 2008/0134283 A1 | 6/2008 | Park | |
| 2008/0186971 A1* | 8/2008 | Carmichael | C07D 217/08 370/392 |
| 2012/0155472 A1 | 6/2012 | Jun | |
| 2013/0034100 A1* | 2/2013 | Goyal | G06N 5/02 370/392 |
| 2013/0163475 A1 | 6/2013 | Beliveau | |
| 2013/0163595 A1* | 6/2013 | Doo | H04L 49/3009 370/392 |
| 2014/0219283 A1 | 8/2014 | Park | |
| 2015/0193681 A1* | 7/2015 | Stark | H04L 67/10 706/45 |
| 2015/0244842 A1* | 8/2015 | Laufer | H04L 69/22 370/392 |
| 2015/0358290 A1* | 12/2015 | Jain | H04L 63/0263 711/108 |
| 2016/0094460 A1* | 3/2016 | Shelar | H04L 45/56 370/392 |
| 2016/0239525 A1 | 8/2016 | Treves | |
| 2016/0316044 A1 | 8/2016 | Treves | |
| 2017/0052731 A1* | 2/2017 | Levy | G06F 17/30598 |
| 2017/0063690 A1* | 3/2017 | Bosshart | H04L 45/7457 |

OTHER PUBLICATIONS

Ravikumar V.C. et al., "TCAM Architecture for IP Lookup Using Prefix Properties", Published by the IEEE Computer Society, © 2004 IEEE, Mar.-Apr. 2004, 10 pages.
Sameer Agarwal et al., "Lattice: A Scalable Layer-Agnostic Packet Classification Framework", Electrical Engineering and Computer Sciences University of California at Berkeley, Technical Report No. UCB/EECS-2011-96, Aug. 24, 2011, © 2011, 14 pages.
European Patent Office, International Searching Authority, International Search Report and Written Opinion dated Feb. 23, 2018 for International Application No. PCT/US2017/061142, 11 pages.
European Patent Office, International Searching Authority, International Search Report and Written Opinion dated Feb. 15, 2018 for International Application No. PCT/US2017/061148, 11 pages.

* cited by examiner

SYSTEM AND METHOD FOR PROVIDING A PROGRAMMABLE PACKET CLASSIFICATION FRAMEWORK FOR USE IN A NETWORK DEVICE

CROSS-REFERENCES TO RELATED APPLICATIONS

This patent application is related to U.S. Patent Application titled "SYSTEM AND METHOD FOR PROVIDING PARTITIONS OF CLASSIFICATION RESOURCES IN A NETWORK DEVICE", U.S. patent application Ser. No. 15/377,303, filed Dec. 13, 2016, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to high performance networks, and are particularly related to a system and method for providing a programmable packet classification framework for use in a network device in a high performance network.

BACKGROUND

A high performance network can be built with heterogeneous networks, for example, an Ethernet datacenter and an InfiniBand datacenter, with Ethernet gateways bridging between the two types of networks. Technologies have evolved in the industry that enable overlay networks to be created on top of existing networks in a high performance network. The overlay networks allow datacenters to scale above and beyond the limitations of the existing networks using network overlay protocols.

The scaling of datacenters or applications in the datacenters in a high performance network requires additional packet parsing and processing complexity due to the emergence of newer network overlay protocols. To keep up with higher throughput requirements of the scaled datacenters, some network protocol level offloads need to be performed at the level of lowest hardware components. For example, the network protocol level offloads can be performed by a network interface card (NIC), a switch, or a combination of a NIC and a switch with the work shared between the two. Depending upon where an offload engine resides, the offload engine needs to be optimized differently, so that higher throughput and low latency can be achieved.

Further, with a high performance network increasingly being used to support cloud computing, an increasing number of different types of overlay protocols may be used in the high performance network.

As such, it would be advantageous to provide a packet processing framework that can be programmed to support various overlay protocols and without requiring changes to hardware components supporting the framework. It would also be advantageous for the packet processing framework to have high throughput and low latency without additional optimization whether the packet processing framework is used in a NIC or in a switch, or in both a NIC and a switch.

SUMMARY

In accordance with an embodiment, described herein is a system and method for providing a programmable packet classification framework for use in a network device in a high performance network. The packet classification framework can comprise a plurality of hardware-based programmable classification primitives, including a key composition primitive, a key composition rule primitive, a match action logical structure, and a next action primitive. The classification primitives can be logically strung together, with the results from one classification primitive fed into the next one until the processing of a data packet is completed. The classification framework can use a state machine to track states of the data packet processing, and dynamically adjust behaviors of the classification primitives based on the processing states of a data packet. With the programmable classification primitives, the classification framework can recursively parse data packets of a plurality of protocols without requiring any hardware changes.

DETAILED DESCRIPTION

In a high performance network, packet classification refers to the process of categorizing data packets into "flows", so that all data packets belonging to the same flow obey a predefined rule and are processed in a similar manner. For example, packet classification can be needed for non-best-effort services, such as firewalls and quality of service.

As described above, support for cloud computing can add parsing and processing complexity to data classification in a high performance network.

To address the parsing and processing complexity, described herein is programmable packet classification framework that can comprise a key composition primitive, a key composition rule primitive, a match action logical structure, and a next action primitive. The classification primitives can be logically strung together, with the results from one classification primitive fed into the next one until the processing of a data packet is completed. Each classification primitive can be a set of assembly instructions in the network device.

As used herein, in accordance with an embodiment, the key composition primitive can be used to dynamically create lookup keys for the match action logical structure based on key composition rules passed from a previous processing primitive or structure.

For a data packet current being processed, various bytes can be selected and concatenated into a key array structure. The byte selection can be based on key composition rules, which can specify a byte selection array with indices pointing to byte positions in the data packet. The indices can be relative to a start position of the data packet or relative to a start position of the current network layer that is being processed, or can be derived as a result of a match rule.

In accordance with an embodiment, each lookup key can be associated with a unique identifier (ID) used to determine a context under which the lookup key is used for a match-action lookup in a match action table. Each lookup key can also be associated with a size, which can be used to determine the number of relevant bytes to be selected from the header of a data packet for constructing the lookup key.

As also used herein, in accordance with an embodiment, the key composition rule primitive can represent a structure that includes a lookup key ID, a byte selection array, a length of the lookup key, and a table ID. Each lookup in the match action table can result in a structure described above for use in constructing a lookup key for the next loop of the data packet processing. The key composition rule structure/primitive can be specified either inline with each match in a match action table, or indirectly by using a pointer to another pre programmed structure.

In accordance with an embodiment, for the very first loop in the packet processing pipeline, a similar structure can be available as a default. For example, a default structure can be derived based on a port-of-arrival from a plurality of physical ingress ports on a network device.

As further used herein, in accordance with an embodiment, the match action logical structure can comprise one or more ternary content-addressable memories (TCAM) and one or more lookup tables therein.

As described above, a table ID can be specified in a key composition rule primitive used to construct a lookup key. Based on the table ID, a corresponding lookup table can be chosen for a key-match lookup. Each time a key-match is detected in the selected lookup table, one or more actions can be matched to the key match. When one or more entries in the selected lookup table can match the lookup key, TCAM structures based on precedence rules can be used to determine a unique action.

Furthermore, as used herein, the next action primitive can specify a key composition rule structure which as described above can include a key ID and a next table ID. The next table ID can represent the current lookup table or a different lookup table.

In accordance with an embodiment, the next action primitive can include actions specific to packet parsing match results, such as drop, forward and redirect; and an End or Continue flag that specifies if the packet processing needs to be continued by looking up more fields, or can be terminated.

In addition, the next action primitive can specify one or more precedence rules for a packet processing engine or parser, to determine a final action when multiple records may be available in a match action table for a particular key match in a lookup table.

With the above-described packet classification primitives, a programmable and flexible packet classification framework can be provided in a network device. Since the same lookup table can be used multiple times with different lookup keys, efficient use of TCAMs can be achieved. Further, the packet classification framework can be used to perform deeper packet inspection on a fine grain flow basis based on recursive TCAM/table lookups.

In accordance with an embodiment, the classification framework can use a state machine to track states of the data packet processing, and dynamically adjust behaviors of the classification primitives based on the processing states of a data packet.

With the programmable classification primitives, the classification framework can parse data packets of a plurality of protocols without requiring any hardware changes. Further, the packet classification framework is independent of the underlying networking technologies, and can be applied uniformly to either an InfiniBand or an Ethernet or another type of networking technology.

Figure 1:
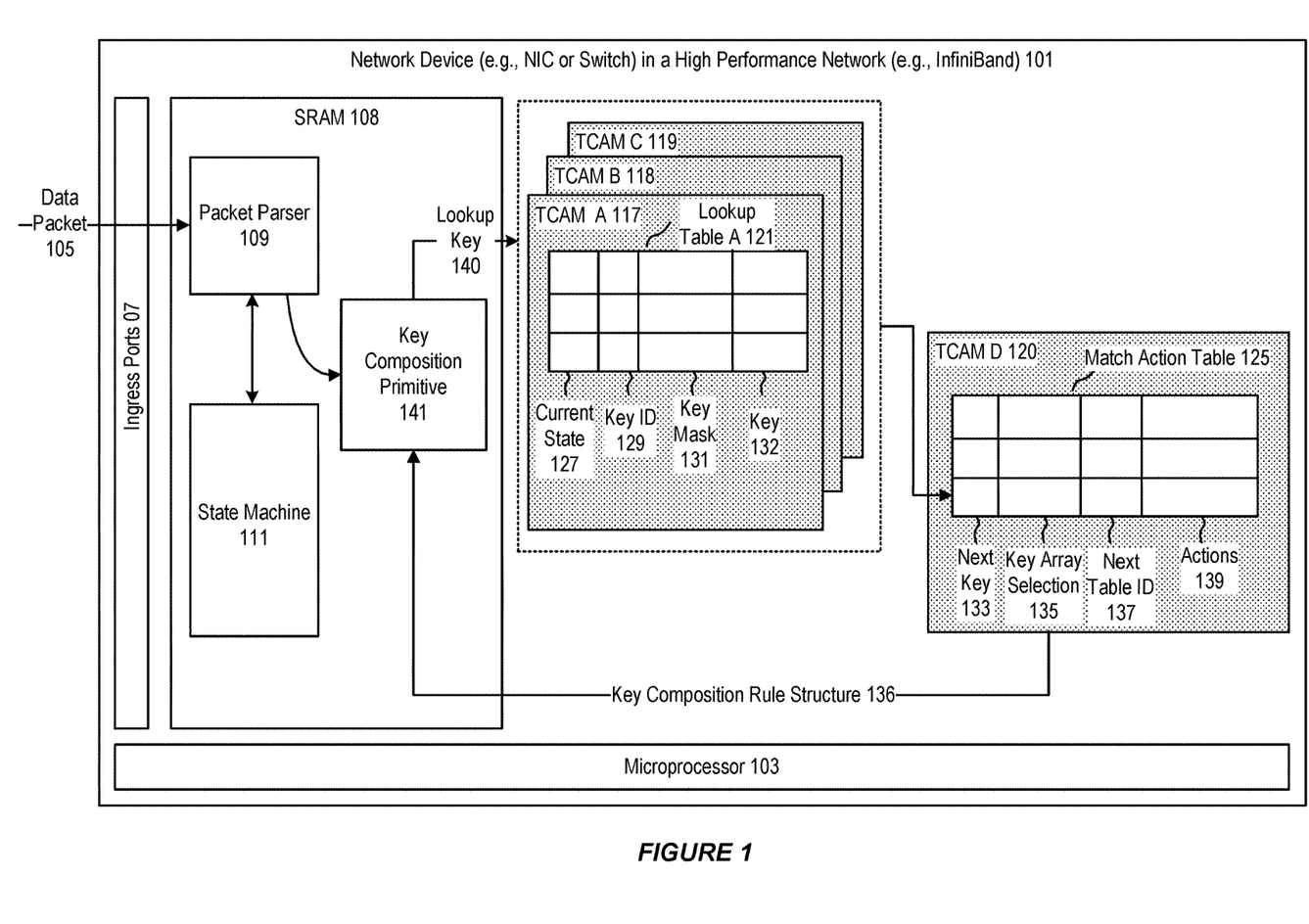
FIG. 1 illustrates a system for providing a programmable packet classification framework for use in a network device in a high performance network, in accordance with an embodiment.

FIG. 1 illustrates a system for providing a programmable packet classification framework for use in a network device in a high performance network, in accordance with an embodiment.

As shown in FIG. 1, a network device 101, for example, a network interface card (NIC) or a switch in an InfiniBand or an Ethernet, can include a plurality of TCAMs, for example, TCAM A 117, TCAM B 118, TCAM C 119 and TCAM D 120; a microprocessor 103; and a static random-access memory (SRAM) 108.

In accordance with an embodiment, each of TCAM A, TCAM B, and TCAM C can include a lookup table. The lookup table in TCAM B and TCAM C are not shown in the figure. The lookup table in TCAM A (for example, lookup table A 121) can include a plurality of fields/columns, and a plurality of pre-populated records/entries.

In accordance with an embodiment, the plurality of fields/columns in lookup table A can include a current state 127, a key ID 129, a key 131, and a key mask 132. Each value in the key field can include bytes corresponding to one or more header fields in an overlay protocol. For example, a value in the key field can be bytes representing an outer IP header in a Virtual Extensible LAN (VXLAN) data packet and one or more additional header fields.

In accordance with an embodiment, each value in the current state field can be bytes indicating which protocol layer that the key is associated with. For example, a value for the current state can be L3 layer.

As further shown in FIG. 1, the network device 101 can include a plurality of ingress ports 107 at which data packets (for example, data packet 105) can be received. The SRAM 108 can include a packet parser 109, a state machine 111 and a key composition primitive 141, each of which can be a program written in assembly instructions.

In accordance with an embodiment, the state machine can keep tracks of processing states of the data packet. The packet parser can receive the data packet 105, and communicate with the state machine for updating the state machine with processing states or receive processing states from the state machine. The packet parser can further invoke the key composition primitive 141 to construct a lookup key 140 based on either a default key composition rules (not shown in FIG. 1), or rules from the key composition rule structure 136 composed from a match action table 125 in TCAM 120.

In accordance with an embodiment, the lookup key can be presented into a lookup table as specified by either the default key composition rules or the key composition rules based on the match in the match action table. A record match with the lookup key in the specified lookup table can result in a record match in the match action table 125.

In accordance with an embodiment, the match in the match action table can include one or more actions, for example, continuing with the next lookup table, exiting and other processing steps. Corresponding to the actions can be a plurality of fields for use in constructing a key composition rule structure for the next loop of the packet processing. The plurality of fields can include a next key (lookup key) 133, a key array selection 135 indicating which bytes to select for constructing the next lookup key, and an ID 137 for the next lookup table 137.

In accordance with an embodiment, each of TCAM A, TCAM B, TCAM C and TCAM can be part of a classification resource hierarchy, including a plurality of levels of classification resource partitions, with one or more hardware-based partitions configured to store flow entries associated with frequently-used or performance-sensitive flows, and a firmware-based partition to access large lookup tables stored in one or more additional memories for classification resource scalability. A lookup key can be used for search for a flow entry match in the hardware-based partitions first. If there is a miss, the lookup key can be presented to the firmware-based partition for further search. Results from the firmware-based level can be dispatched back to a hardware-based parser for further processing. Flow entries can be moved between lookup tables by a partition management block based on utilization of the flow entries.

In accordance with an embodiment, the hardware-based partitions of classification resources can include on or more TCAMs in a level-1 partition, and one or more hash tables in a level-2 partition. The firmware-based partition can represent a level-3 partition of classification resources, and can include an embedded processor subsystem comprising multiple network processing elements (PEs), and each PE can be based on a full-fledged microprocessor, or a microcontroller, or a state-machine-based hardware engine.

In accordance with an embodiment, the partition management block can be a mix of hardware-based actions and firmware-based actions to efficiently manage lookup tables and flow entries in each partition of classification resources, so that a given performance target can be met. The system can support a plurality of features to facilitate the management actions related to lookup tables.

The classification resource hierarchy can be used to manage and scale large amounts of classification resources that are partitioned as a hierarchy of TCAMs, hash tables, and firmware-based subsystem connected to an external or remote memory, with caching at each level. Each level in the hierarchy can store flow entries, and can vary in terms of throughput, latency, and power consumption. The framework described herein is independent of the type of underlying networking technology such as InfiniBand or Ethernet, and can be applied uniformly to a plurality of network technologies.

In accordance with an embodiment, as described above, the plurality of hardware-based programmable classification primitives can be logically strung together, with the results from one classification primitive fed into the next one until the processing of a data packet is completed.

Figure 2:
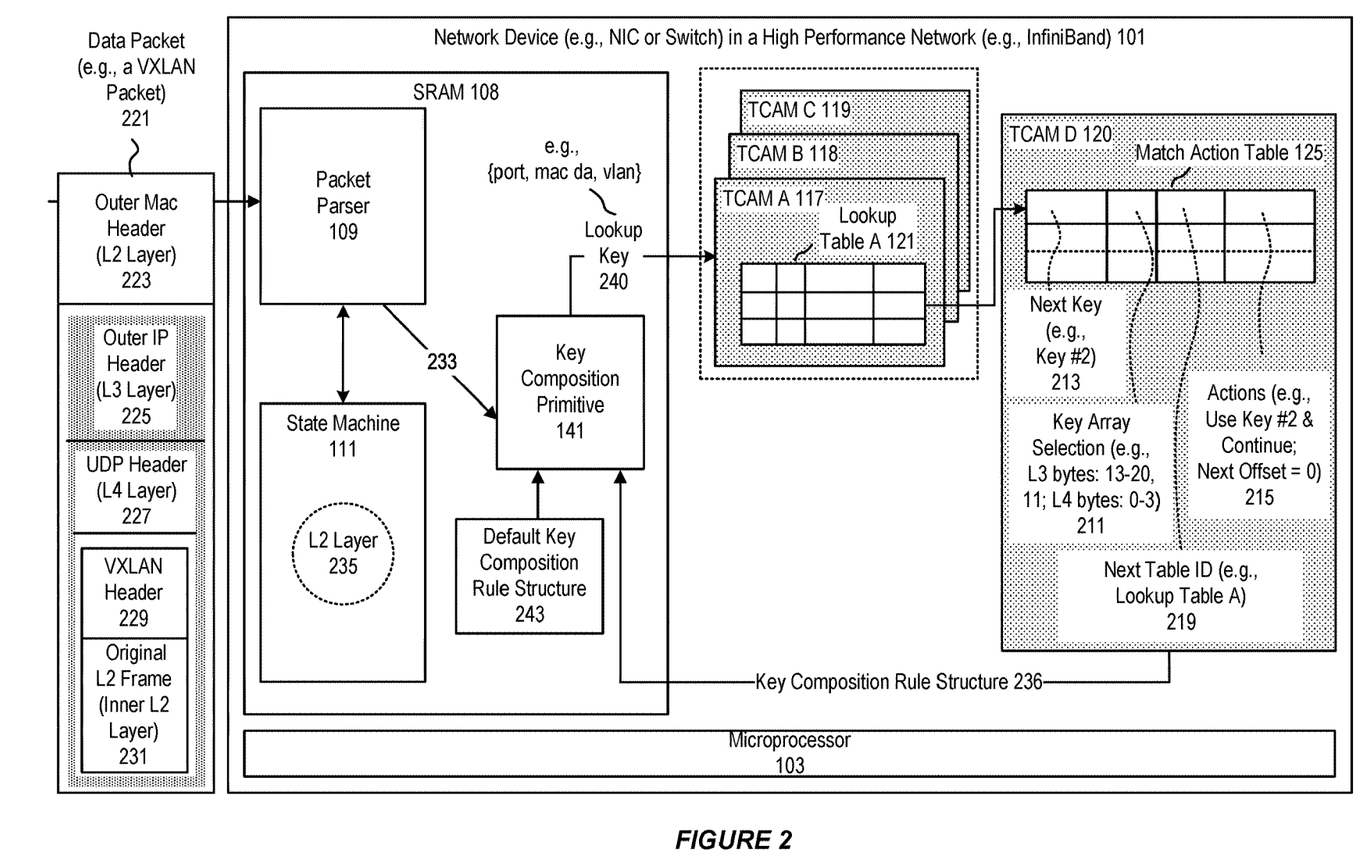
FIG. 2 further illustrates a system for providing a programmable packet classification framework for use in a network device in a high performance network, in accordance with an embodiment.

FIG. 2 further illustrates a system for providing a programmable packet classification framework for use in a network device in a high performance network, in accordance with an embodiment.

As shown in FIG. 2, the packet parser can receive a data packet 221. In this particular illustration, the data packet is a VXLAN data packet. The system is not limited to data packets of VXLAN format, and can be similarly used to parse data packets of a plurality of other protocols or other formats.

For example, the system can be used to parse data packets based on the following protocols: Shortest Path Bridging (SPB), Transparent Interconnection of Lots of Link (TRILL), Locator/ID Separation Protocol (LISP), Network Virtualization using Generic Routing Encapsulation (NVGRE), and Stateless Transport Tunnelling (STT).

In accordance with an embodiment, VXLAN is a Layer 2 overlay encapsulation protocol over a Layer 3 network. VXLAN can use MAC Address-in-User Datagram Protocol (MAC-in-UDP) encapsulation to provide a means to extend Layer 2 segments across a datacenter network. VXLAN provides a solution to support a flexible, large-scale multi-tenant environment over a shared common physical infrastructure. The transport protocol over the physical datacenter network is IP plus UDP.

In a VXLAN data packet as shown in FIG. 2, an original Layer 2 frame 231 has a VXLAN header 229 added, and is placed in a UDP-IP packet, as indicated by an outer IP header 225 and an UDP header 227. With this MAC-in-UDP encapsulation and a Layer 2 outer MAC header 223, VXLAN can tunnel Layer 2 network over Layer 3 network.

In an accordance with an embodiment, the VXLAN data packet can include an 8-byte VXLAN header that consists of a 24-bit VNID and a plurality of reserved bits. The VXLAN header together with the original Ethernet frame can be placed in the UDP payload. The 24-bit VNID can be used to identify Layer 2 segments and to maintain Layer 2 isolation between the segments. With all 24 bits in VNID, VXLAN can support 16 million LAN segments.

In accordance with an embodiment, when the packet parser receives the VXLAN data packet, it can update the states machine with a state 235 indicating that one or more Layer 2 headers are to be processed. A default key composition rule structure 243 can be derived based on a port-of-arrival. The packet parser can invoke 233 the key composition primitive to construct the lookup key 240 for use in performing a lookup in the TCAM-based lookup table A 121.

For example, the default key composition rule structure can comprise the following information: key ID=0; length=8; key array selection=bytes: 0-5, bytes 16-17.

In accordance with an embodiment, a default table ID (for example, lookup table A), and the above information can be used to construct a key {port, mac da, vlan}, where "port" is the port number which the VXLAN data packet is received at, "mac da" is the media access control (MAC) destination address, and "vlan" is a type of virtual LAN.

As further shown in FIG. 2, a match with the lookup key in the lookup table A, can result in a match in the match action table.

For example, the match in the match action table can include one or more actions 215, for example, "User Key #2 & Continue; Next Offset=0"; a next table ID 219, for example, "lookup table B"; a key array selection 211, for example, L3 bytes: 13-20, 11; L4 bytes: 0-3; and a next key ID 213, for example, Key #2. The above information can be used to construct a key composition rule structure 236 for use in the next loop of the data packet processing.

In accordance with an embodiment, once a match in the lookup table is found, one or more instruction sets in the TCAM can be triggered to execute the actions and construct the key composition rule structure.

Figure 3:
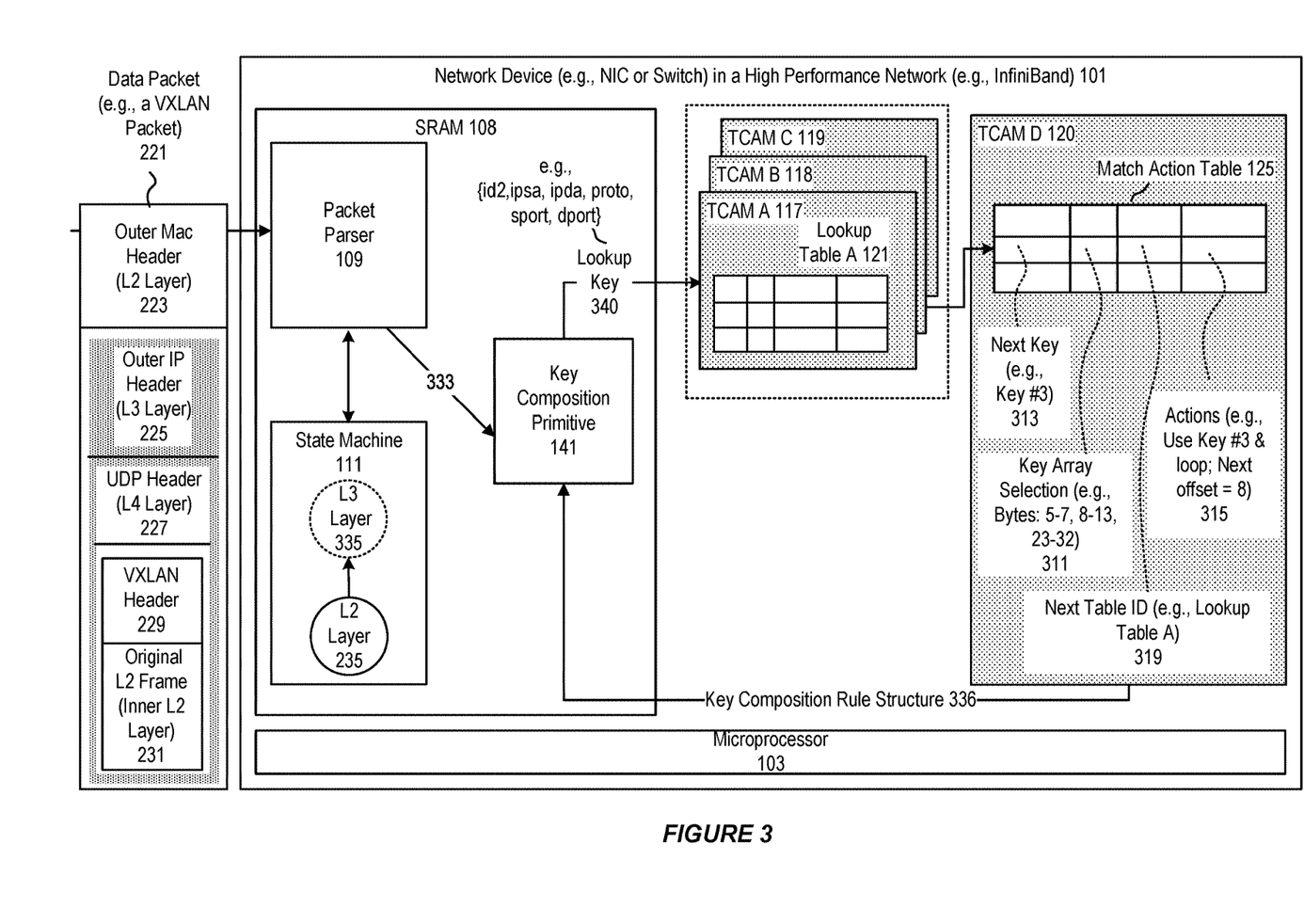
FIG. 3 further illustrates a system for providing a programmable packet classification framework for use in a network device in a high performance network, in accordance with an embodiment.

FIG. 3 further illustrates a system for providing a programmable packet classification framework for use in a network device in a high performance network, in accordance with an embodiment.

In accordance with an embodiment, the next loop of the data packet processing is L3 Layer processing, as reflected by the state of L3 Layer 335 in the state machine. The packet parser can invoke 333 the key composition primitive to construct a lookup key 340 using the key composition rule structure 236 as described in FIG. 2.

As shown in FIG. 3, the lookup key 340 can be {id2, ipsa, ipda, proto, sport, dport}, which can be a byte array. The lookup key can include "ipsa" for an IP source address, "ipda" for an IP destination address", "proto" for a protocol such as UDP, dport for a destination port such as vxlan. The "ipsa", "ipda", "proto", "sport" and "dport" can represent information selected from the headers of the VXLAN data packet using the indexes in the key array selection of the key composition rule structure 236 used to construct the lookup key. The "id2" is the ID of the lookup key inserted by the key composition primitive.

In accordance with an embodiment, when an ID of a lookup key is included in the byte array representing the lookup key, the lookup key can be presented to the same lookup table as the lookup table used in the immediate previous loop of the data packet processing.

For example, since the previous immediate loop uses lookup table A, the lookup key 340 can be presented again to lookup table A for a match.

In accordance with an embodiment, the lookup key match in lookup table A can result in a match in the match action table.

As shown in FIG. 3, the match in the match action table can include one or more actions 315, for example, "User Key #3 & loop; Next Offset=8"; a next table ID 319, for example, "lookup table A"; a key array selection 311, for example, Bytes: 5-7, 8-13, 23-32; and a next key ID 313, for example, Key #3. The above information can be used to construct a key composition rule structure 336 for use in the next loop of the data packet processing.

Figure 4:
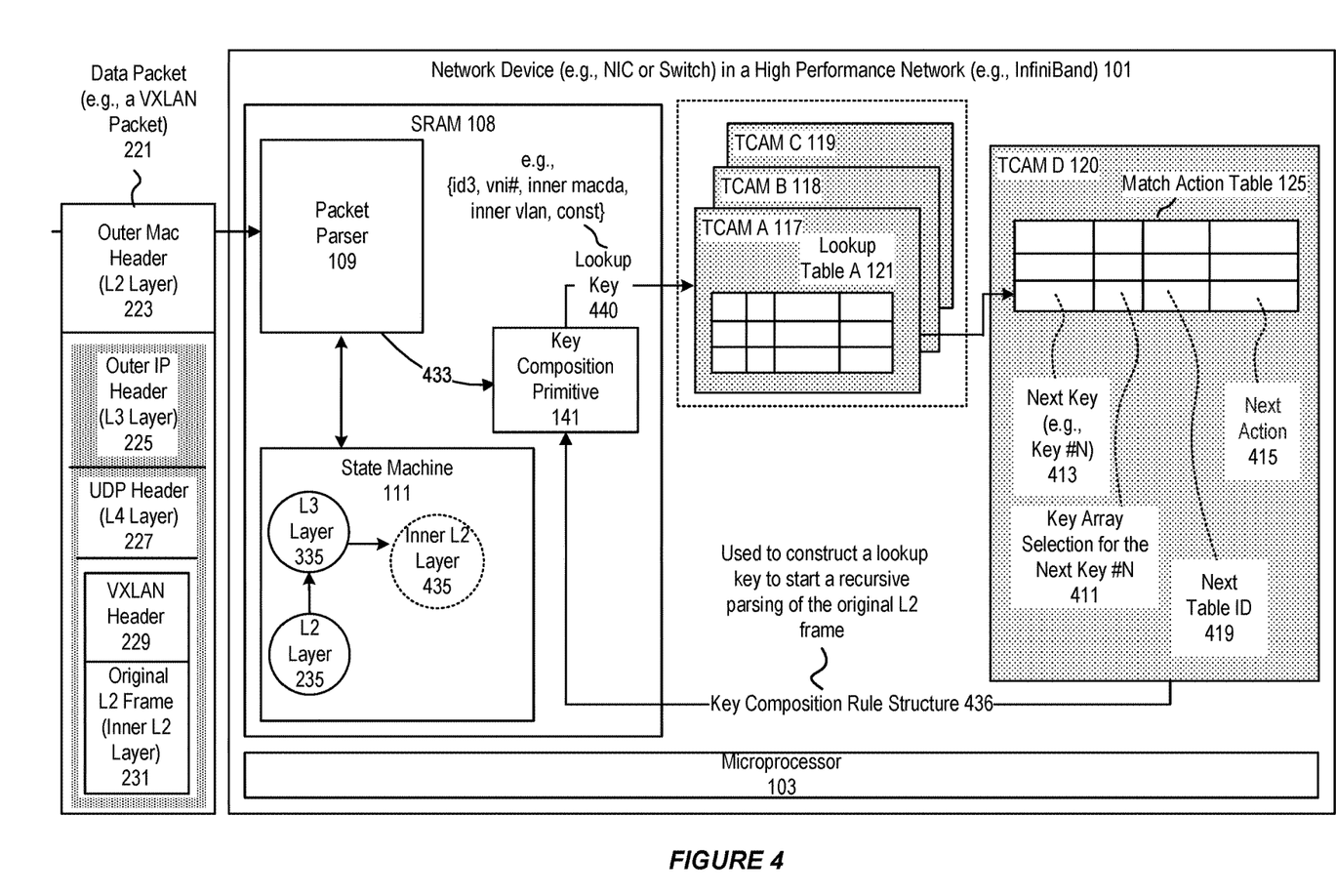
FIG. 4 further illustrates a system for providing a programmable packet classification framework for use in a network device in a high performance network, in accordance with an embodiment.

FIG. 4 further illustrates a system for providing a programmable packet classification framework for use in a network device in a high performance network, in accordance with an embodiment.

As shown in FIG. 4, the packet parser can invoke 433 the key composition primitive to construct a new lookup key 440 based on the key composition rule structure composed in FIG. 3.

In accordance with an embodiment, the lookup key 440 can include a key ID "id3", a plurality of other header fields selected from the header of the data packet 221 based on a byte selection array with indexes pointing to byte positions in the data packet. Since the lookup key 440 represented by a byte array includes the ID of the key, the lookup key can be presented to the same lookup table (i.e. lookup table A 121) used in the immediate previous loop (i.e. the loop described in FIG. 3).

As shown in FIG. 4, the packet parser 109 in FIG. 4 can process header fields at the original L2 frame of the data packet 221, which is shown by the state of inner L2 layer 435 in the state machine 111.

In accordance with an embodiment, after the lookup key 440 is presented to lookup table A and is matched with a record in the lookup table, an action 415 in the match action table can be triggered to start a recursive parsing of the original L2 frame 231 by constructing a key composition rule structure 626 from a next key ID 413, a key array selection for the next key 411, and a next table ID 419, for use in composing a next lookup key In accordance with an embodiment, the resursive nature of the data packet parsing can continue until the data packet is fully parsed, or when an action specifying a next stage of the packet processing, for example, ending the packet processing, is encountered.

Figure 5:
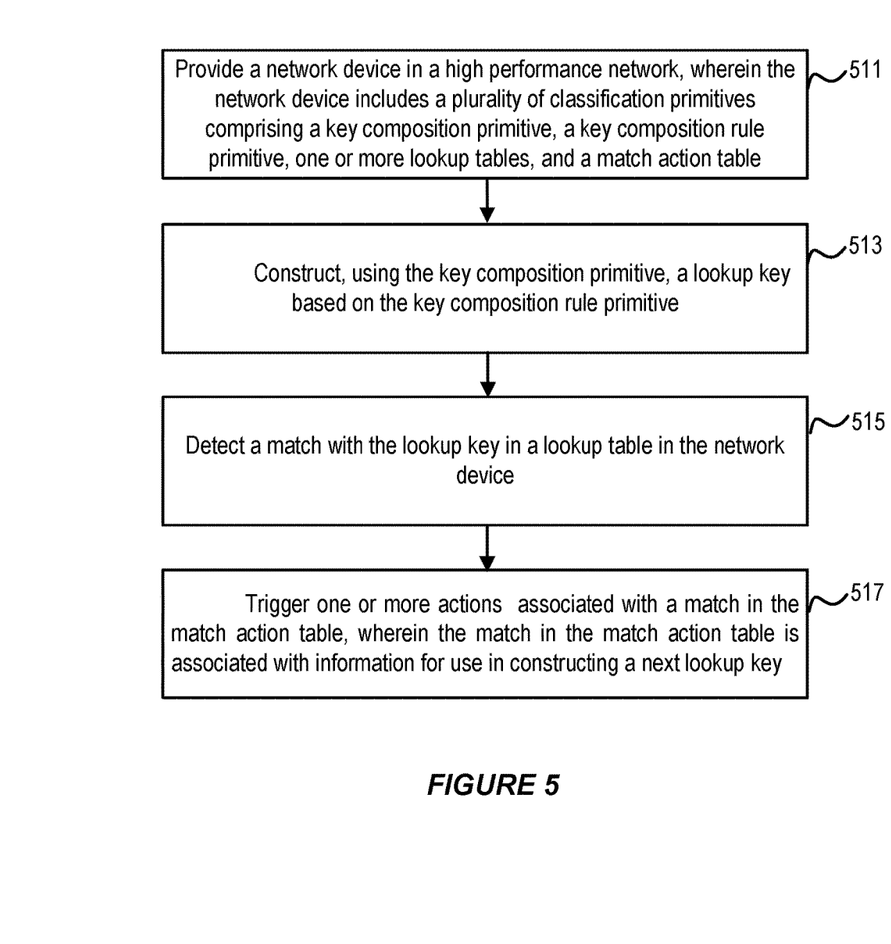
FIG. 5 illustrates a method for providing a programmable packet classification framework for use in a network device in a high performance network, in accordance with an embodiment.

FIG. 5 illustrates a method for providing a programmable packet classification framework for use in a network device in a high performance network, in accordance with an embodiment.

As shown in FIG. 5, at step 511, a network device in a high performance network is provided, wherein the network device includes a plurality of classification primitives comprising a key composition primitive, a key composition rule primitive, one or more lookup tables, and a match action table.

At step 513, a lookup key is constructed by the key composition primitive based on the key composition rule primitive.

At step 515, a match with the lookup key is detected in a lookup table in the network device.

At step 517, one or more actions associated with a match in the match action table are triggered, wherein the match in the match action table is associated with information for use in constructing a next lookup key.

InfiniBand™

InfiniBand™ (IB) is an example high performance network in which the system and method described above can be used.

InfiniBand™ is an open standard lossless network technology developed by the InfiniBand™ Trade Association. The technology is based on a serial point-to-point full-duplex interconnect that offers high throughput and low latency communication, geared particularly towards high-performance computing (HPC) applications and datacenters.

The InfiniBand™ Architecture (IBA) supports a two-layer topological division. At the lower layer, IB networks are referred to as subnets, where a subnet can include a set of hosts interconnected using switches and point-to-point links. At the higher level, an IB fabric constitutes one or more subnets, which can be interconnected using routers.

Within a subnet, hosts can be connected using switches and point-to-point links. Additionally, there can be a master management entity, the subnet manager (SM), which resides on a designated device in the subnet. The subnet manager is responsible for configuring, activating and maintaining the IB subnet. Additionally, the subnet manager (SM) can be responsible for performing routing table calculations in an IB fabric. Here, for example, the routing of the IB network aims at proper load balancing between all source and destination pairs in the local subnet.

Through the subnet management interface, the subnet manager exchanges control packets, which are referred to as subnet management packets (SMPs), with subnet management agents (SMAs). The subnet management agents reside on every IB subnet device. By using SMPs, the subnet manager is able to discover the fabric, configure end nodes and switches, and receive notifications from SMAs.

In accordance with an embodiment, intra-subnet routing in an IB network can be based on LFTs stored in the switches. The LFTs are calculated by the SM according to the routing mechanism in use. In a subnet, Host Channel Adapter (HCA) ports on the end nodes and switches are addressed using local identifiers (LIDs). Each entry in an LFT consists of a destination LID (DLID) and an output port. Only one entry per LID in the table is supported. When a packet arrives at a switch, its output port is determined by looking up the DLID in the forwarding table of the switch. The routing is deterministic as packets take the same path in the network between a given source-destination pair (LID pair).

Generally, all other subnet managers, excepting the master subnet manager, act in standby mode for fault-tolerance. In a situation where a master subnet manager fails, however, a new master subnet manager is negotiated by the standby subnet managers. The master subnet manager also performs periodic sweeps of the subnet to detect any topology changes and reconfigure the network accordingly.

Furthermore, hosts and switches within a subnet can be addressed using local identifiers (LIDs), and a single subnet can be limited to 49151 unicast LIDs. Besides the LIDs, which are the local addresses that are valid within a subnet, each IB device can have a 64-bit global unique identifier (GUID). A GUID can be used to form a global identifier (GID), which is an IB layer three (L3) address.

The SM can calculate routing tables (i.e., the connections/routes between each pair of nodes within the subnet) at network initialization time. Furthermore, the routing tables can be updated whenever the topology changes, in order to ensure connectivity and optimal performance. During normal operations, the SM can perform periodic light sweeps of the network to check for topology changes. If a change is discovered during a light sweep or if a message (trap) signaling a network change is received by the SM, the SM can reconfigure the network according to the discovered changes.

For example, the SM can reconfigure the network when the network topology changes, such as when a link goes down, when a device is added, or when a link is removed. The reconfiguration steps can include the steps performed during the network initialization. Furthermore, the reconfigurations can have a local scope that is limited to the subnets, in which the network changes occurred. Also, the segmenting of a large fabric with routers may limit the reconfiguration scope.

Figure 6:
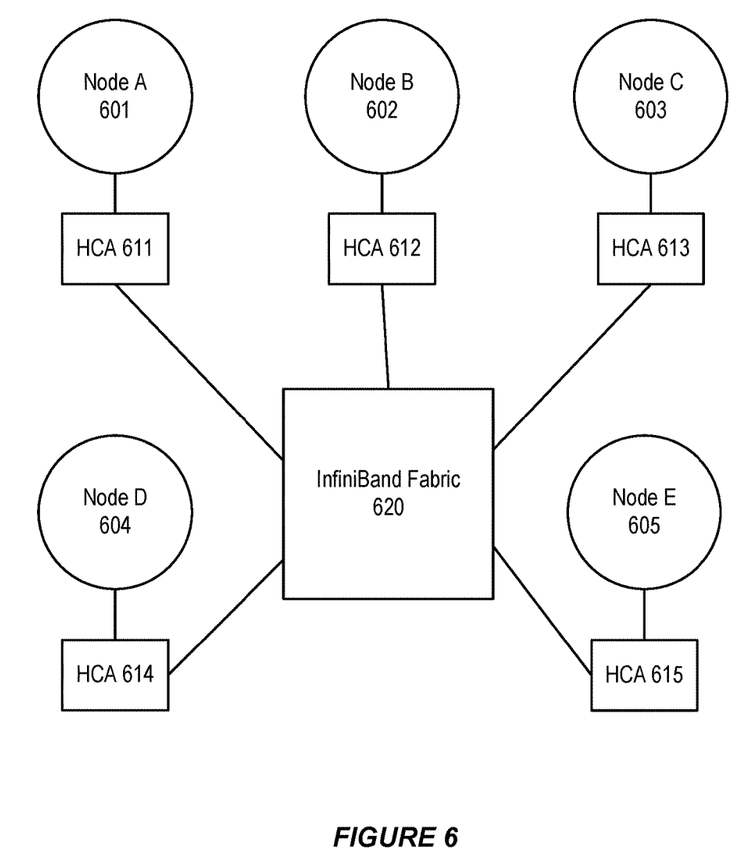
FIG. 6 shows an example high performance network, in accordance with an embodiment.

An example InfiniBand fabric is shown in FIG. 6, which shows an illustration of an InfiniBand environment, in accordance with an embodiment. In the example shown in FIG. 1, nodes A-E 601-605, use the InfiniBand fabric 620, to communicate, via the respective host channel adapters 611-615. In accordance with an embodiment, the various nodes, e.g., nodes A-E 601-605, can be represented by various physical devices. In accordance with an embodiment, the various nodes, e.g., nodes A-E 601-605, can be represented by various virtual devices, such as virtual machines.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated.

What is claimed is:

1. A network device providing a programmable packet classification framework in a network device in a high performance network, comprising:
   a memory, and a microprocessor;
   a plurality of ingress ports for receiving data packets based on a plurality of protocols;
   a plurality of hardware-based classification primitives including a key composition primitive, a key composition rule primitive, and a next action primitive;
   one or more lookup tables, and a match action table;
   a state machine configured to track states of the processing of each data packet;
   wherein the key composition primitive is configured to construct a current lookup key for said each data packet based on the key composition rule primitive, and to present the current lookup key to a lookup table;
   wherein a match with the lookup key in the lookup table results in an action match in the match action table for said each data packet;
   wherein the action match is associated with information for use in constructing a next lookup key for said each data packet;
   wherein each of the current lookup key and the next lookup is associated with a value in the state machine, wherein the value indicates a particular protocol layer being processed in said each data packet;
   wherein the plurality of classification primitives are logically connected, with a result from one classification primitive fed into the next classification primitive;
   whereby the network device is configured to,
      parse each of said data packets recursively using the plurality of classification primitives until classification of said each data packet based on a particular protocol of the plurality of protocols is completed,
      categorize said data packets into a plurality of flows based on said classification of each of said data packets,
      and process said data packets categorized into each of said plurality of flows according to a predefined rule associated with said each of said plurality of flows.

2. The system of claim 1, wherein each of a plurality of hardware-based classification primitives is programmable, and is based on either a ternary content-addressable memories (TCAMs) or a static random-access memory (SRAM) of said memory of said network device.

3. The system of claim 1, wherein the network device is an Ethernet network interface card, or an Ethernet network switch.

4. The system of claim 1, wherein the key composition rule primitive is a structure residing in a TCAM in the memory of the network device, and includes a key ID, a byte selection array, a length of the lookup key, and a table ID.

5. The system of claim 4, wherein the byte selection array includes indexes pointing to byte positions in a data packet, wherein the indexes are relative to a start position of the data packet or a start position of a current network layer being processed, or derived as a result of a match rule.

6. The system of claim 1, wherein the network device is an InfiniBand network interface card, or an InfiniBand network switch.

7. The system of claim 1, wherein when a particular data packet is initially received by the network device, a default key composition rule primitive is used by the key composition primitive to construct a lookup key.

8. The system of claim 7, wherein the default key composition rule primitive is based on a port of arrival of the plurality of ingress ports on the network device at which the particular data packet was received.

9. A method for categorizing and processing data packets in a high performance network, the method comprising:
providing a network device, wherein the network device includes,
a programmable packet classification framework having a plurality of hardware-based classification primitives comprising a key composition primitive, a key composition rule primitive,
one or more lookup tables,
a match action table,
a state machine wherein states of the processing of each of the data packets are tracked using a state machine, and
a plurality of ingress ports;
receiving, at the plurality of ingress ports, data packets based on a plurality of protocols;
constructing, using the key composition primitive, a current lookup key based on the key composition rule primitive;
detecting a match with the lookup key in said one or more lookup tables; and
triggering one or more actions associated with a match in the match action table;
constructing a next lookup key using information associated with the match in the match action table, wherein each of the current lookup key and the next lookup is associated with a value in the state machine, wherein the value indicates a particular protocol layer being processed in said each data packet;
wherein the plurality of hardware-based classification primitives are logically connected, with a result from one primitive fed into the next one;
parsing each of said data packets recursively using the plurality of hardware-based classification primitives until classification of said each data packet based on a particular protocol of the plurality of protocols is completed;
categorizing said data packets into a plurality of flows based on said classification of each of said data packets; and
processing said data packets categorized into each of said plurality of flows according to a predefined rule associated with said each of said plurality of flows.

10. The method of claim 9, wherein each of a plurality of hardware-based classification primitives is programmable, and is based on either a ternary content-addressable memories (TCAMs) or a static random-access memory (SRAM).

11. The method of claim 9, wherein the data packets are configured to be parsed recursively by the plurality of classification primitives.

12. The method of claim 9, wherein the key composition rule primitive is a structure residing in a TCAM in the network device, and includes a key ID, a byte selection array, a length of the lookup key, and a table ID.

13. The method of claim 12, wherein the byte selection array includes indexes pointing to byte positions in a data packet, wherein the indexes are relative to a start position of the data packet or a start position of a current network layer being processed, or derived as a result of a match rule.

14. The method of claim 9, wherein the network device is a network interface card or a switch in an InfiniBand network or an Ethernet network.

15. The method of claim 9, wherein when a data packet is initially received by the network device, a default key composition rule primitive is used by the key composition primitive to construct a lookup key.

16. A non-transitory computer-readable storage medium storing a set of instructions for supporting categorizing data packets in a network device in a high performance network, wherein the network device includes, a plurality of ingress ports, a plurality of hardware-based classification primitives comprising a key composition primitive, a key composition rule primitive, one or more lookup tables, and a match action table, for use in processing data packets based on a plurality of protocols, wherein states of the processing of each of the data packets are tracked using a state machine, said instructions, when executed by the network device, cause the network device to perform steps comprising:
receiving, at the plurality of ingress ports, data packets based on the plurality of protocols;
constructing, using the key composition primitive, a current lookup key based on the key composition rule primitive;
detecting a match with the lookup key in said one or more lookup tables; and
triggering one or more actions associated with a match in the match action table;
constructing a next lookup key using information associated with the match in the match action table, wherein each of the current lookup key and the next lookup is associated with a value in the state machine, wherein the value indicates a particular protocol layer being processed in said each data packet;
wherein the plurality of hardware-based classification primitives are logically connected, with a result from one primitive fed into the next one;
parsing each of said data packets recursively using the plurality of hardware-based classification primitives until classification of said each data packet based on a particular protocol of the plurality of protocols is completed;
categorizing said data packets into a plurality of flows based on said classification of each of said data packets; and
processing said data packets categorized into each of said plurality of flows according to a predefined rule associated with said each of said plurality of flows.

17. The non-transitory computer-readable storage medium of claim 16, wherein each of a plurality of classification primitives is programmable, and is based on either a ternary content-addressable memories (TCAMs) or a static random-access memory (SRAM).

18. The non-transitory computer-readable storage medium of claim 16, wherein the data packets are configured to be parsed recursively by the plurality of classification primitives.

19. The non-transitory computer-readable storage medium of claim 16, wherein the key composition rule primitive is a structure residing in a TCAM in the network device, and includes a key ID, a byte selection array, a length of the lookup key, and a table ID.

20. The non-transitory computer-readable storage medium of claim 19, wherein the byte selection array includes indexes pointing to byte positions in a data packet, wherein the indexes are relative to a start position of the data packet or a start position of a current network layer being processed, or derived as a result of a match rule.

* * * * *

UNITED STATES PATENT AND TRADEMARK OFFICE
CERTIFICATE OF CORRECTION

PATENT NO.         : 10,341,242 B2
APPLICATION NO.    : 15/377303
DATED              : July 2, 2019
INVENTOR(S)        : Srinivasan et al.

It is certified that error appears in the above-identified patent and that said Letters Patent is hereby corrected as shown below:

In the Specification

In Column 8, Line 2, delete "key" and insert -- key. --, therefor.

In Column 8, Line 3, delete "resursive" and insert -- recursive --, therefor.

In the Claims

In Column 10, Line 43, in Claim 1, after "lookup" insert -- key --.

Signed and Sealed this
Twenty-eighth Day of July, 2020

Andrei Iancu
*Director of the United States Patent and Trademark Office*